United States Patent [19]

Herman et al.

[11] Patent Number: 5,120,074
[45] Date of Patent: Jun. 9, 1992

[54] VELOCIPEDE

[76] Inventors: Leonard A. Herman, 3198 Old Post Dr.; Morris Helman, 3 Sayrewood Ct., both of Baltimore, Md. 21208; David W. Jones, 8 Warren Lodge Ct., Unit 1B, Cockeysville, Md. 21030

[21] Appl. No.: 650,591
[22] Filed: Feb. 5, 1991
[51] Int. Cl.⁵ .......................... B62M 1/04; B62M 1/20
[52] U.S. Cl. ..................... 280/220; 280/221; 280/226.1; 280/227; 280/256; 280/282; D12/107; D12/112
[58] Field of Search ............ 280/221, 220, 226.1, 280/227, 256, 282; D12/111, 112, 113, 107

[56] References Cited

U.S. PATENT DOCUMENTS

| D. 146,645 | 4/1947  | Donalson    | 280/226.1 |
|------------|---------|-------------|-----------|
| 94,990     | 9/1869  | Armando     | 280/226.1 |
| 115,212    | 5/1871  | Janson      | 280/233   |
| 456,217    | 7/1891  | Goodrich    | 280/227   |
| 529,717    | 11/1894 | Deacon      | 280/226.1 |
| 1,734,775  | 11/1929 | Ostby       | 280/226.1 |
| 2,529,930  | 11/1950 | Foulke      | 280/274   |
| 2,546,822  | 3/1951  | Herrick     | 280/226.1 |
| 3,044,802  | 7/1962  | Douglas et al. | 280/256 |
| 3,133,747  | 5/1964  | Nelson      | 280/226.1 |
| 3,666,291  | 5/1972  | Ortiz       | 280/226.1 |
| 4,664,400  | 5/1987  | Date        | 280/226.1 |
| 4,746,135  | 5/1988  | Oh          | 280/262   |
| 4,779,882  | 10/1988 | Date        | 280/226.1 |

FOREIGN PATENT DOCUMENTS 49426   8/1911  Fed. Rep. of Germany.
304173  4/1917  Fed. Rep. of Germany.
8803    of 1892 United Kingdom ............ 280/226.1

Primary Examiner—Mitchell J. Hill
Attorney, Agent, or Firm—Shlesinger, Arkwright & Garvey

[57] ABSTRACT

A velocipede comprising a rigid frame with front and rear wheels and a crank operably connected to the rear wheels. A first member has its front end portion pivotably connected to the frame front end such that the first member is movable between upper and lower positions above and below a horizontal line passing through the pivot. A second member has a first end pivotably connected to the first member rear end portion and a second end pivotably connected to the crank such that reciprocating movement of the first member rear end portion causes the second member to rotate the crank. A third member includes a pivot disposed at its intermediate portion and has its front and rear ends movable between upper and lower positions. A pair of pedals are pivotably secured to the third member front end and movable therewith between the upper and lower positions. A fourth member has one end pivotably connected to the first member rear end portion and a second end pivotably connected to the third member rear end such that when the first member is in the lower position, the pedals are at their upper position and when the first member is in the upper position, the pedals are in their lower position. A seat is disposed intermediate the first member front and rear ends and substantially directly above the third member pivot such that when the pedals are at their upper position, the pedals are slightly forward of the seat.

20 Claims, 3 Drawing Sheets

VELOCIPEDE

FIELD OF THE INVENTION

The present invention relates generally to a driver propelled vehicle and particularly to a velocipede propelled by means of a reciprocating means utilizing the weight of the driver.

BACKGROUND OF THE INVENTION

Donalson, U.S. Pat. No. 146,645, is an early development showing a velocipede utilizing the up and down motion of the driver. Unfortunately, the seat is positioned a substantial distance behind the pivot of the foot pedal bar and a substantial distance from the foot pedals, requiring a substantial effort to operate the vehicle. Furthermore, the position of the seat requires the driver to get off the seat in order to operate the pedals during part of the cycle when the pedals are required to be pushed down. Finally, the position of the seat causes a substantial amount of gyration to the seat, making for an uncomfortable ride.

The present invention provides a velocipede that eliminates or minimizes the disadvantages cited above.

OBJECTS AND SUMMARY OF THE INVENTION

It is an object of the present invention to provide a vehicle that is propelled by means of the up and down movement of the body of the rider and corresponding movement of the legs while pushing down on the pedals.

It is another object of the present invention to provide a vehicle that is propelled by a crank driven by the combined driver's weight and feet pressure with substantially greater ease as compared to the Donalson device.

It is still an object of the present invention to provide a vehicle that is lightweight, sturdy and simple to manufacture.

It is yet another object of the present invention to provide a velocipede which is adjustable to various sizes of individuals.

It is another object of the present invention to provide a velocipede that could function as a therapy device for the handicapped.

It is an object of the present invention to provide a velocipede that functions as an exercise machine.

It is another object of the present invention to provide a vehicle that is fun to operate by children.

It is still another object of the present invention to provide a vehicle that is relatively stable.

These and other objects of the present invention will become apparent from the following detailed description.

BRIEF DESCRIPTIONS OF THE DRAWINGS

DETAILED DESCRIPTION OF THE INVENTION

Figure 1:
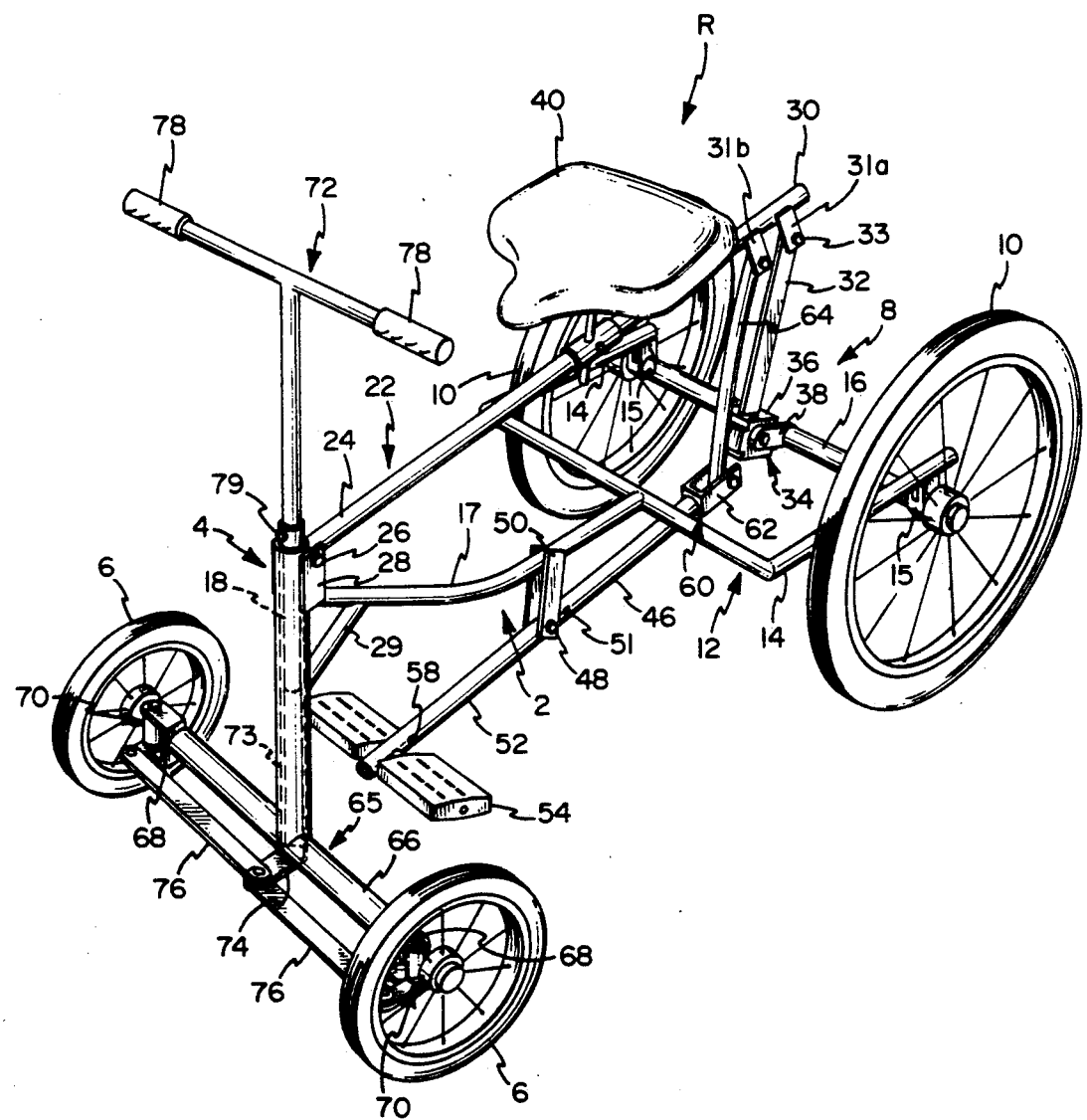
FIG. 1 is a front perspective view, with portions shown in phantom lines, of a velocipede according to the present invention.

An embodiment of a velocipede R in accordance with the present invention is disclosed in FIG. 1. It comprises a rigid frame 2, preferably made of light weight metal typically used in bicycle construction. The frame 2 has a front end portion 4 operably associated with front wheels 6 and rear end portion 8 operably associated with rear wheels 10.

Figure 3:
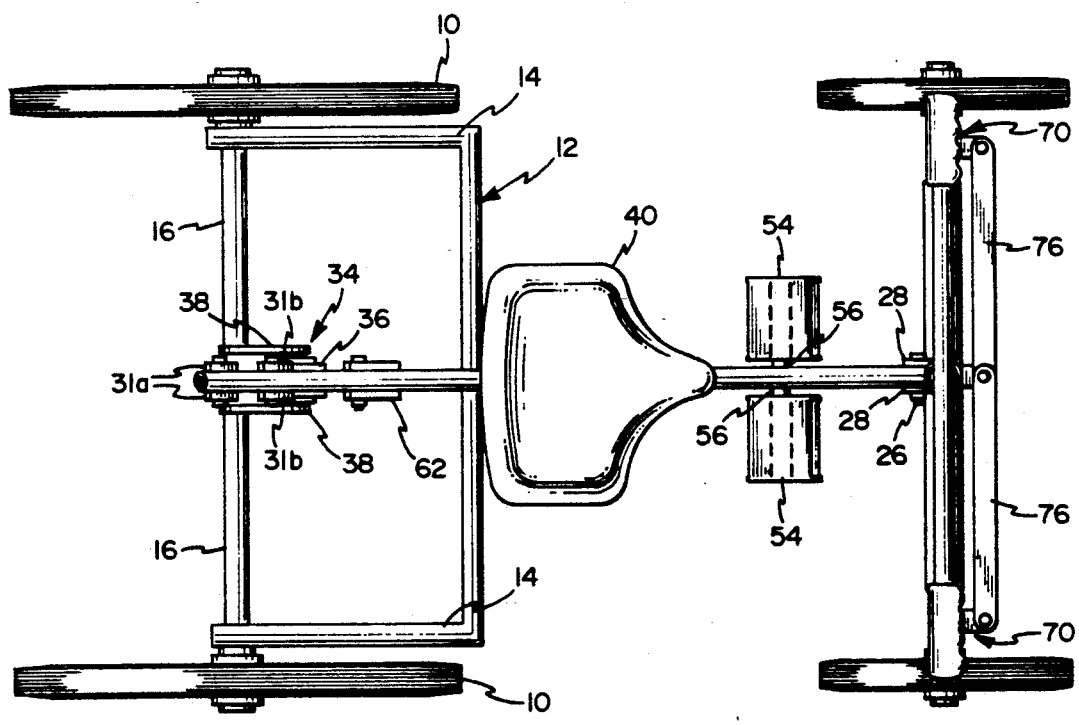
FIG. 3 is a top plan view of the velocipede.

As shown in FIGS. 1 and 3, the frame 2 has a Y-shaped yoke 12 having fork portion 14 provided with axle bearings 15 for supporting stub axles 16 on which are mounted rear wheels 10. The yoke 12 includes yoke leg portion 17 rigidly connected to a vertical portion 18 of the front end portion 4 of the frame 2.

Figure 2:
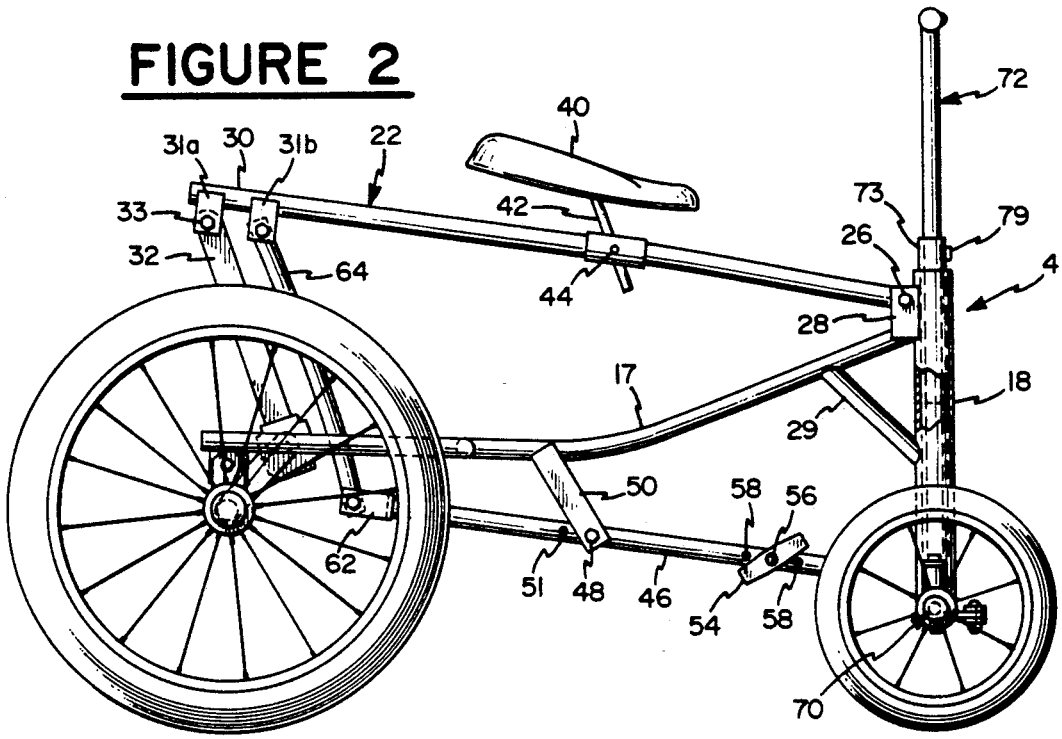
FIG. 2 is a right side elevational view, with portions shown broken away, of the velocipede.

A cross bar or first member 22 is disposed above the Y-shaped yoke 12 and extends from the vertical portion 18 to the rear end portion 8 of the frame 2. The cross bar 22 has a front end portion 24 that is pivotally connected to the vertical portion 18 by pivot 26 secured to a pair of brackets 28 that are welded or secured by conventional means to the vertical portion 18 and the yoke leg portion 17, as best shown in FIGS. 1 and 2. A reinforcing brace 29 connecting yoke leg portion 17 and vertical portion 18 is provided to reinforce the front end portion 4.

The cross bar or second member 22 has a rear end portion 30 including brackets 31a and 31b. One end of a bar 32 is pivotally connected to the brackets 31a by means of pivot 33 and the other end is rotatably connected to a crank 34.

The crank 34 includes a bearing block 36 and includes crank arms 38 connected to stub axles 16, such that rotation of the crank 34 causes corresponding rotation of the wheels 10. Preferably, only one of the stub axles 16, rather than both, is secured to one of the wheels 10 in a rotatable fashion while the other stub axle 16 is rigidly secured to the other wheel 10, in order to provide a differential turning of the wheels 10 when driving around a curve.

A seat 40 is disposed substantially at the middle portion of the cross bar 22. A stem 42 connected to the seat 40 and held in the cross bar 22 by a lock bolt 44, which provides means for adjusting the height of the seat 40.

The pivot 26 is preferably disposed on the vertical member 18 such that the cross bar 22 moves above and below the horizontal between its upper and lower positions, respectively, as will be further described below.

A tubular member or third member 46 is secured by pivot 48 at its intermediate portion. The pivot 48 is supported by a pair of brackets 50 secured to the leg portion 17 by welding or other conventional means. Hole 51 disposed in the tubular member 46 provides an alternate position for pivot 48. The tubular member 46 is disposed below the Y-shaped yoke 12 and extends generally from the front end portion 4 to the rear end portion 8 of the frame 2. The tubular member 46 has a front end 52, which carries a pair of pedals 54 that are pivotable on supporting rod 56, as best shown in FIGS. 1 and 2. The pedals 54 may be repositioned by securing the supporting rod 56 in any of the holes 58 disposed in the front end 52 of the tubular member 46, thereby providing means for adjusting the leverage on the pedals 54. The rod 56 is secured to the tubular member 46 by conventional means (not shown). The pedals 54 are conventional.

The tubular member 46 has a rear end 60, which includes a yoke 62 that is pivotally secured to one end of a tubular member or fourth member 64. The other end of the tubular member 64 is pivotally secured to the brackets 31b on the rear portion 30. The tubular member 64 is bent toward the front end portion 4 of the frame 2 in order to provide clearance to the crank 34 during its rotation.

The pivot 48 is shown as disposed substantially directly below the seat 40 such that the pedals 54 are advantageously disposed slightly forward of the seat 40 when the pedals are in their upper position, as will be further described below.

The frame 2 has a T-shaped portion 65 having a horizontal tubular member 66. At each end of the tubular member 66 is a yoke 68, which is pivotally connected to a stub axle assembly 70 (FIG. 2) rotatably securing each of the front wheels 6 and pivotally connected to each of the respective yokes 68. A T-shaped steering handle 72 is rotatably and telescopically supported in the vertical portion 18. Tube 73, in vertical portion or sleeve 18, receives at its upper end a handle 72. The tube 73 is rigidly secured at its lower end to bracket 74 by welding or lock screw and nut or the like. The bracket 74 (FIG. 1) is pivotally connected to a pair of links 76 that are pivotally connected to the stub axle assemblies 70, as best shown in FIGS. 1 and 3. The T handle 72 has hand grips 78 disposed at each end of the horizontal member of the handle. The T-handle is adjustably held in sleeve or tube 73 by a lock screw 79.

OPERATION

FIG. 4

The velocipede R is propelled by a rider by means of his weight and his legs pushing against the pedals 54. During operation, the crank 34 will trace a circular path 80 for each cycle. The pivot 33 will travel along an arc 82 between an upper position 84 and a lower position 86 as the cross bar 22 pivots about pivot 26 during each cycle. The pedals 54 will move along an arc 88 between an upper position at 90 and a lower position 92 as the tubular member 46 pivots about pivot 48 during each cycle. At the same time, the center point 93 of the seat 40 will traverse an arc 94 between an upper position 96 and a lower position 98.

Figure 4:
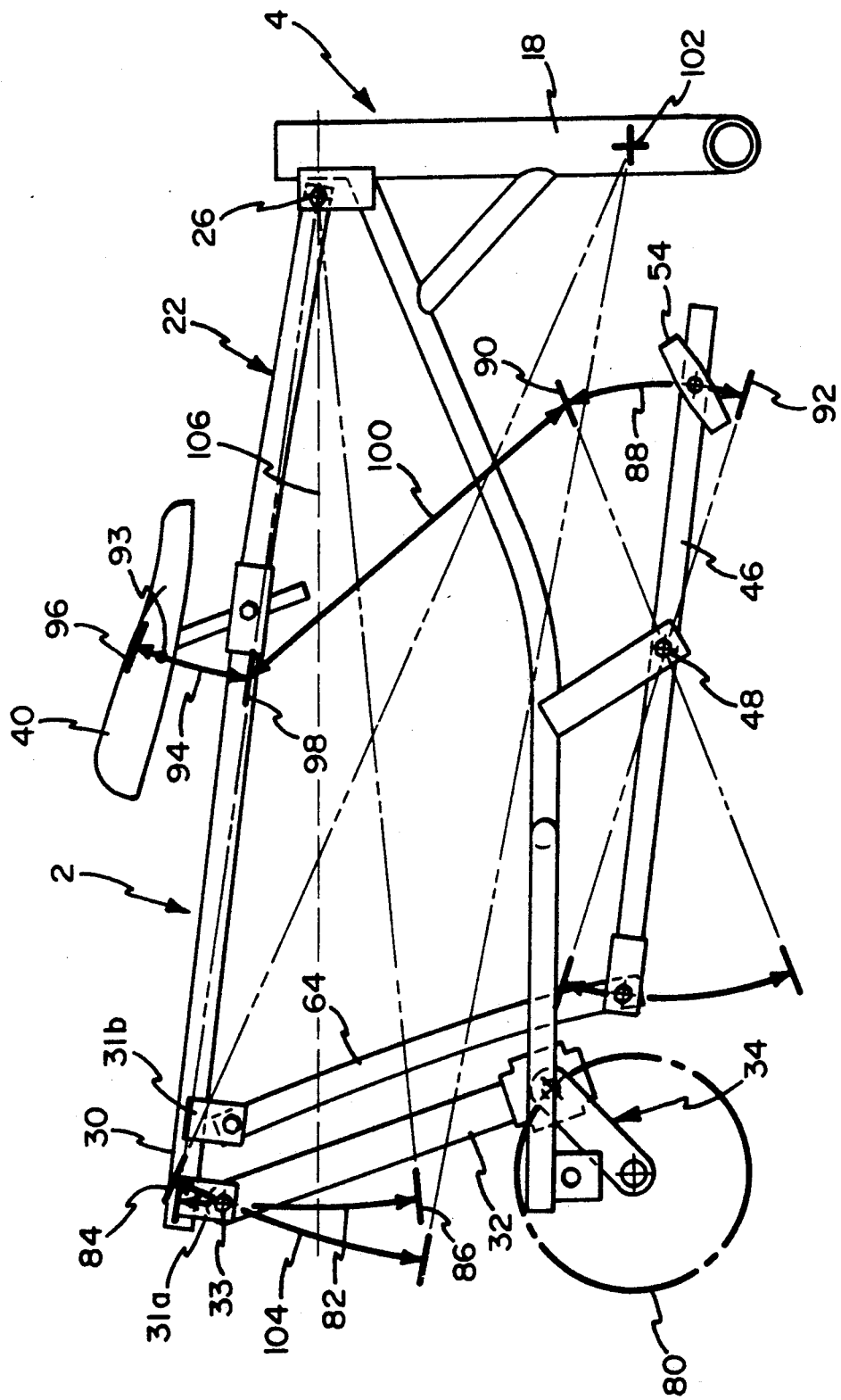
FIG. 4 is a diagrammatic schematic side elevational view of the drive mechanism of the velocipede.

To operate the velocipede R, the rider is positioned on the seat 4. The weight of the rider causes the cross bar 22 to pivot about pivot 26, thereby causing the bar member 32 to rotate the crank 34 in the clockwise direction, as viewed in FIG. 4. As the cross bar 22 moves downwardly, the tubular member 64 causes the tubular member 46 to pivot about 48, thereby causing the pedals 54 to travel along the arc 88 in the upward direction. When the pivot 33 which is at its lower position at 86, the pedals 54 will have reached their upper position 90. The crank 34 will also be at its lowest position, but owing to the momentum generated by the motion of the vehicle R from the rotating crank 34, the crank will move past its lowest position and continue to rotate along the circle 80. The driver then pushes on the pedals 54, causing the tubular member 64 to move upwardly. The upward movement of the cross bar 22 causes the crank 34 to rotate back to its upper position. When the pedals reach their lower position at 92, the weight of the driver then causes the crank 34 to move downwardly and start another cycle. The momentum of the velocipede R causes the crank to move past its upper point and towards its downward path.

A person of ordinary skill in the art will appreciate that the up and down motion of the seat 40, as disposed in the intermediate portion of the cross bar 22, is less than if the seat 40 were located at the rear end portion 30, as in the Donalson device referred to above, since the arc 94 traversed by the seat 40 in the intermediate location is less than the arc 82 traversed by the seat in the end location. Therefore, the seat 40 will experience less gyration, providing a more comfortable ride.

The seat 40 is advantageously disposed substantially directly above the pivot 48 such that the seat 40 when it reaches its lower point at 98 and the pedals 54 when they reach their upper point at 90 will be disposed along a line 100 which is oriented for maximum application of force from the driver's legs, without requiring the driver to stand up on the pedals 54. If the seat 40 were located at the rear end portion 30 of the cross bar 22, it would be clear to a person of ordinary skill in the art that the angle of the line connecting the seat and the pedals would make a shallow angle, thereby causing most of the force applied by the driver's legs in the horizontal direction rather than in the vertical direction, where it is mostly needed and necessitating the driver to stand up on the pedals 54 to operate the pedals.

The pivot 26 is advantageously disposed on the vertical portion 18 such that the arc 82 traversed by the pivot point 33 is minimum. If the pivot 26 were located at 102, as in the Donalson device referred to above, then during operation, the pivot 33 will traverse an arc 104, which is longer than the arc 82 due to the longer radial distance between the pivots 102 and 33. Thus, a person of ordinary skill in the art will appreciate that the location of the pivot 26 provides for more efficient performance of work. Also, the pivot 26 is advantageously located on the frame 2 such that the cross bar 22 will move substantially equally above and below a horizontal reference line 106 thereby minimizing the slope that the seat 40 makes with the horizontal at its upper and lower positions at 96 and 98, respectively, thereby minimizing the sliding effect on the driver when the seat 40 is sloping upwardly or downwardly.

Although the velocipede R has been disclosed as having two front wheels, a person of ordinary skill in the art will understand that a single front wheel will also work. A single front wheel configuration will provide for easier turning.

A brake is not considered necessary, since when the operator stops pushing on the pedals, the velocipede R will stop moving; however, a conventional braking system on either the rear wheels, the front wheels or both could be incorporated if it is later determined to be necessary for greater safety.

A person of ordinary skill in the art will understand that the velocipede R can be scaled to any size to fit the size of the driver.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A velocipede, comprising:
a) a rigid frame having front and rear ends;
b) front wheel assembly operably connected to said front end;
c) rear wheel assembly operably connected to said rear end;
d) a crank operably associated with said rear wheel assembly such that rotation of said crank causes corresponding rotation of said rear wheel assembly;
e) a first member having front and rear end portions;
f) a pivot operably secured to said frame front end and said first member front end portion such that at least said first member rear end portion is movable between upper and lower positions that are above and below a horizontal line passing through said pivot;
g) a second member having a first end pivotably connected to said first member rear end portion and a second end pivotably connected to said crank such that reciprocating movement of said first member rear end portion between said upper and lower positions causes said second member to rotate said crank, thereby driving said rear wheel assembly;
h) a third member including a pivot disposed at its intermediate portion;
i) said third member having front and rear ends, said front and rear ends being reciprocatingly movable between upper and lower positions;
j) a pair of pedals pivotably secured to said third member front end and movable therewith between said third member upper and lower positions;
k) a fourth member having one end pivotably connected to said first member rear end portion and a second end pivotably connected to said third member rear end such that when said first member rear end portion is in said lower position, said pedals are at their upper position and when said first member rear end portion is in said upper position, said pedals are in their lower position; and
l) a seat disposed intermediate said first member front and rear end portions and substantially directly above said third member pivot such that when said pedals are at their upper position, said pedals are slightly forward of said seat.

2. A velocipede as in claim 1, wherein:
a) said frame including a "Y" shaped portion and a vertical portion; and
b) said "Y" shaped portion having a fork portion operably connected to said rear wheel assembly and a leg portion rigidly connected to said vertical portion.

3. A velocipede as in claim 2, wherein:
a) said first member rear end portion is disposed above said "Y" shaped portion.

4. A velocipede as in claim 2, wherein:
a) said third member rear end is disposed below said "Y" shaped portion.

5. A velocipede as in claim 1, and further comprising:
a) means for adjusting the height of said seat.

6. A velocipede as in claim 1, and further comprising:
a) means for adjusting t he mechanical advantage of said third member and said pedals.

7. A velocipede as in claim 6, wherein:
a) said adjusting means includes a plurality of holes disposed in said third member front end; and
b) said pedals being removably securable to any one of said holes.

8. A velocipede as in claim 2, wherein:
a) said frame includes a reinforcing brace rigidly secured to said leg portion and said vertical portion.

9. A velocipede as in claim 1, and further comprising:
a) a steering mechanism for said front wheel assembly.

10. A velocipede as in claim 9, wherein:
a) said steering mechanism includes a "T" shaped handle; and
b) means for adjusting the height of said handle.

11. A velocipede as in claim 1, wherein:
a) said fourth member is bent towards said front end portion of said frame.

12. A velocipede, comprising:
a) a rigid frame having front and rear ends;
b) front wheel assembly operably connected to said front end;
c) rear wheel assembly operably connected to said rear end;
d) a crank operably associated with said rear wheel assembly such that rotation of said crank causes corresponding rotation of said rear wheel assembly;
e) a first member having front and rear end portions;
f) a pivot operably associated with said first member front end portion and said frame such that said first member front end portion is reciprocatingly pivotable between upper and lower positions;
g) said pivot is disposed on said frame such that said first member rear end portion moves above and below a horizontal line passing through said pivot when moving between said upper and lower positions;
h) a second member having a first end pivotably connected to said first member rear end portion and a second end pivotably connected to said crank such that reciprocating movement of said first member rear end portion between said upper and lower positions causes said second member to rotate said crank, thereby driving said rear wheel assembly;
i) a third member including a pivot disposed at its intermediate portion;
j) said third member having front and rear ends, said front and rear ends being reciprocatingly movable between upper and lower positions;
k) a pair of pedals pivotably secured to said third member front end and movable therewith between said third member upper and lower positions;
l) a fourth member having one end pivotably connected to said first member rear end portion and a second end pivotably connected to said third member rear end such that when said first member rear end portion is in said lower position, said pedals are at their upper position and when said first member rear end portion is in said upper position, said pedals are in their lower position; and
m) a seat disposed intermediate said first member front and rear end portions.

13. A velocipede as in claim 12, wherein:
a) said frame including a "Y" shaped portion and a vertical portion; and
b) said "Y" shaped portion having a fork portion operably connected to said rear wheel assembly and a leg portion rigidly connected to said vertical portion.

14. A velocipede as in claim 13, wherein:
a) said first member rear end portion is disposed above said "Y" shaped portion.

15. A velocipede as in claim 13, wherein:
a) said third member rear end is disposed below said "Y" shaped portion.

16. A velocipede as in claim 12, wherein:
a) said seat is disposed substantially directly above said third member pivot.

17. A velocipede as in claim 12, and further comprising:
a) means for adjusting the mechanical advantage of said third member and said pedals.

18. A velocipede as in claim 17, wherein:
a) said adjusting means includes a plurality of holes disposed in said third member front end; and
b) said pedals being removably securable to any one of said holes.

19. A velocipede as in claim 12, and further comprising:
a) a steering mechanism for said front wheel assembly.

20. A velocipede as in claim 19, wherein:
a) said steering mechanism includes an adjustable "T" shaped handle.

* * * * *